Figure 1:
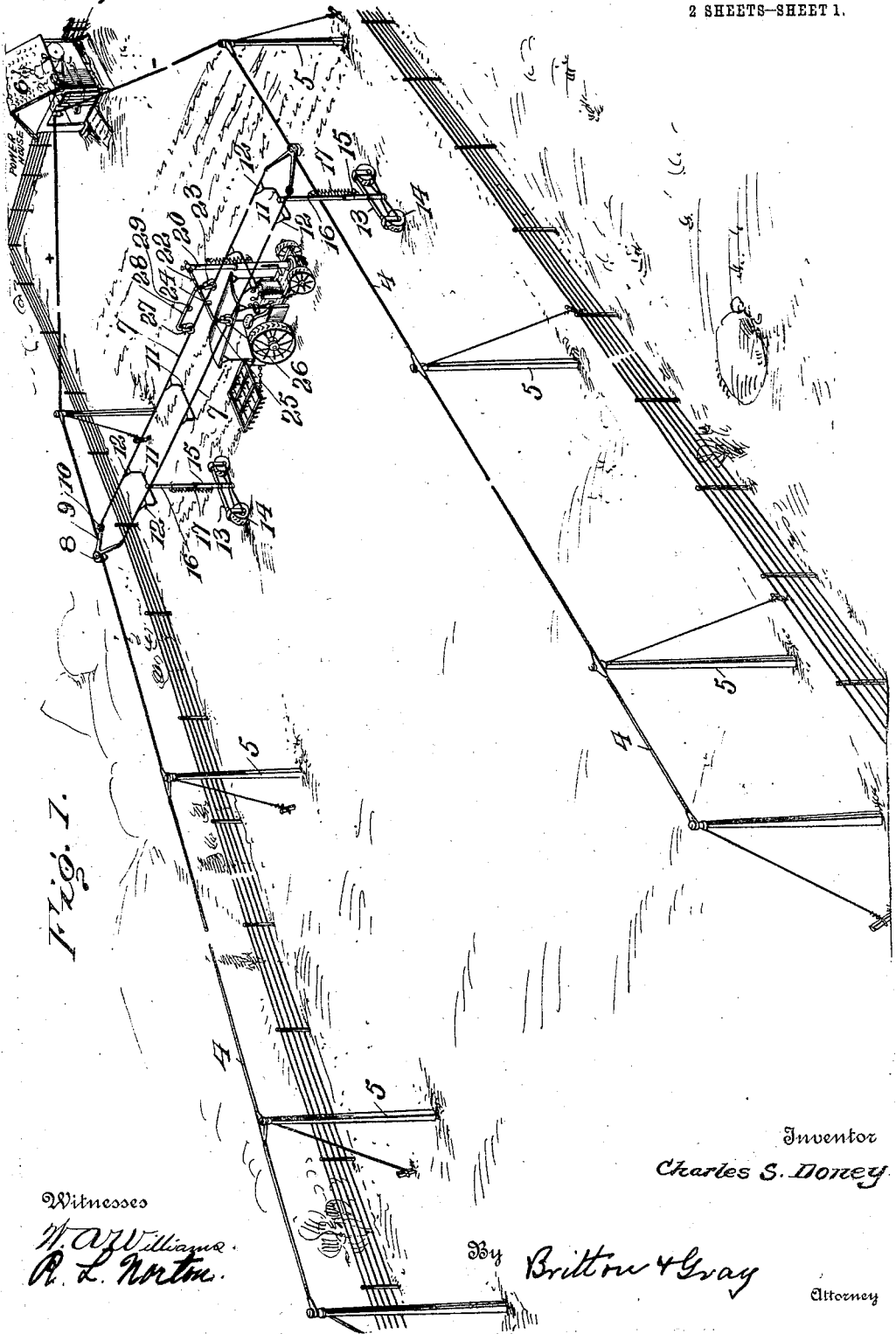

C. S. DONEY.
ELECTRICAL AGRICULTURAL SYSTEM.
APPLICATION FILED APR. 5, 1910.

982,175.

Patented Jan. 17, 1911.
2 SHEETS—SHEET 1.

Witnesses
W. A. Williams.
R. L. Norton.

Inventor
Charles S. Doney
By Britton & Gray
Attorney

C. S. DONEY.
ELECTRICAL AGRICULTURAL SYSTEM.
APPLICATION FILED APR. 5, 1910.
982,175.
Patented Jan. 17, 1911.
2 SHEETS—SHEET 2.
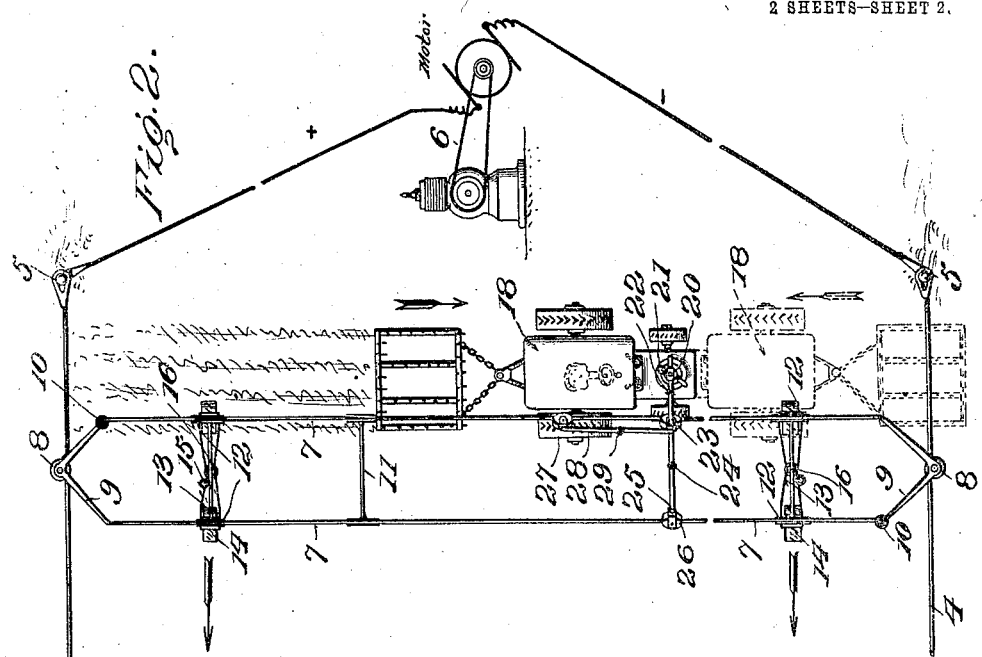
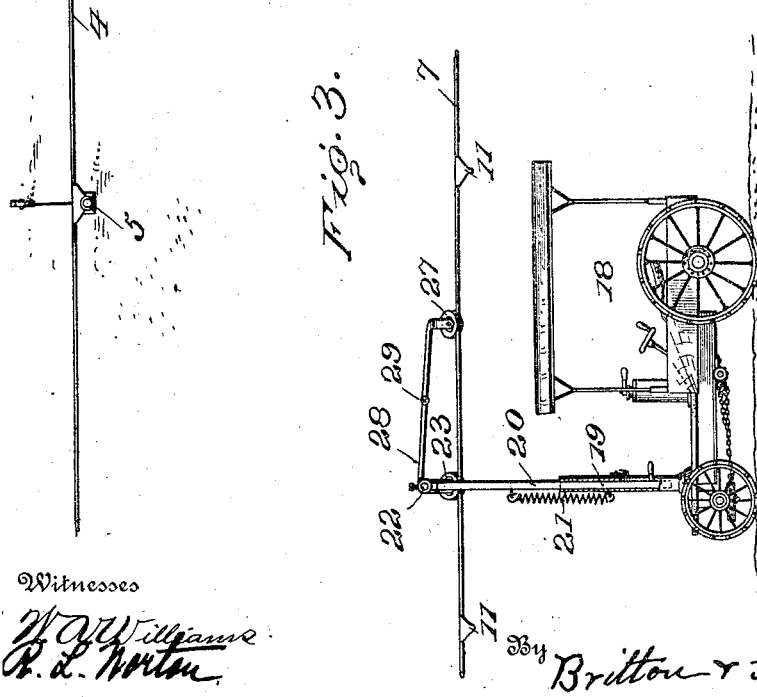
Witnesses
Inventor
Charles S. Doney.
By Britton & Gray
Attorney

UNITED STATES PATENT OFFICE.

CHARLES S. DONEY, OF COLUMBIA FALLS, MONTANA, ASSIGNOR OF ONE-THIRD TO CHARLES H. FOOT, OF KALISPELL, MONTANA, AND ONE-THIRD TO GEORGE D. WATT, OF COLUMBIA FALLS, MONTANA.

ELECTRICAL AGRICULTURAL SYSTEM.

982,175.   Specification of Letters Patent.   Patented Jan. 17, 1911.

Application filed April 5, 1910. Serial No. 553,601.

*To all whom it may concern:*

Be it known that I, CHARLES S. DONEY, a citizen of the United States, residing at Columbia Falls, in the county of Flathead and State of Montana, have invented certain new and useful Improvements in Electrical Agricultural Systems, of which the following is a specification.

My invention relates to certain new and useful improvements in electrical agricultural systems and the object of my invention is to supply electrical current to a movable electric motor which is adapted to attain any part of a certain area.

My invention more particularly relates to a motor adapted to propel agricultural implements over a predetermined area and to cause the agricultural implement to reach all parts of said area.

With these and other objects in view my invention consists in supporting an electrical conductor on each side of the field or area to be covered by the electric motor and in connecting these conductors by a pair of transverse wires or conductors, one of which is in electrical contact with one of the conductors and the other with the other conductor; and, further, in providing the vehicle to be propelled with an electric motor and a trolley pole carrying trolley wheels adapted to contact with the transverse conductors.

My invention further consists in certain constructions, combinations and arrangement of parts, the preferred form of which will be first described in connection with the accompanying drawings, and then the invention particularly pointed out in the appended claims.

Referring to the drawings, wherein the same part is designated by the same reference numeral whenever it occurs: Figure 1 is a perspective view representing a field equipped with my invention; Fig. 2 is a plan view of the same; and Fig. 3 is a side elevation of an electrically propelled vehicle, and a portion of one of the transverse conductors.

4, 4 are a pair of electric conductors which are shown as supported upon poles 5 at each side of a field. These electric conductors may be of any desired construction either in the form of a wire or bar and supported in any desired way. One of these conductors is connected to the positive and one to the negative side of a suitable source of electrical energy, as the dynamo 6. The conductors 4 extend parallel to each other on opposite sides of the field to be covered and extend the full length thereof.

Extending between the parallel conductors 4 are a pair of transverse conductors 7 which extend parallel to each other across the field, and are connected at their ends to trolley wheels 8 which run upon the conductors 4. One of the transverse conductors 7 is connected with the positive conductor 4 and the other with the negative conductor 4. The form of connection shown consists of a pair of elbow arms 9, each of which carries at its apex a trolley wheel 8. To the ends of these arms the conductors 7 are connected, as best shown in Fig. 2, the positive conductor being electrically connected to the arm whose trolley runs upon the positive conductor 4 and the negative conductor 7 being electrically connected to the arm 9 running upon the negative conductor 4. The positive conductor 7 is connected to the arm 9 of the negative side and the negative conductor 7 is connected to the arm 9 of the positive side through insulators 10 of any desired construction.

11 are a series of spacers which extend between the conductors 7 and are connected to the conductors by suitable insulators 12. These spacers hold the conductors 7 in parallel spaced relation for the full width of the field.

To prevent the sagging of the conductors 7, I provide suitable supports at intervals, these supports being preferably extended down from certain of the spacers 11. In the form of my invention shown, each of these supports consists of a body portion 13, on the ends of which are mounted the rollers 14.

15 is a tube extended up from the support 13 and 16 is a rod connected at its upper end to the spacer 11 and having its lower end extending into the tube 15. I also provide means tending to force the rod 16 out of the tube 15, such means being illustrated as comprising a compression spring 17, connected at one end to the rod and at the other end to the tube. These supports will consequently operate to hold the transverse conductors in their elevated position and at the same time the spring 17 will permit the wheels of the supports to pass over inequalities in the ground.

18 designates a traction engine or other vehicle operated by an electric motor, the motor being of any desired type, and its construction forms no part of the present invention. This engine carries a trolley pole having wheels adapted to run upon the transverse conductors and supply current to the motor. In the form of my invention shown, the trolley comprises a tubular support 19 extending up from the engine, and in this tube is slidably mounted a pole 20. The pole 20 and the tube 19 are connected together by a tension spring 21, whereby the spring tends to draw the pole into the tube. At the upper end, the pole is provided with an arm 22 which extends out at right-angles from the pole, and 23 is a trolley wheel carried by the arm 22. Connected to the arm 22 by means of a pivot 24 is an arm 25, carrying at its end, a second trolley wheel 26, the trolley wheel 23 being adapted to run on one of the transverse conductors and trolley wheel 26 on the other. The pivot 24 is to permit the trolley wheel 26 to always remain in contact with its transverse conductor 7. I also provide a third trolley wheel 27, which is carried by an arm 28, said arm being formed of two parts connected together by means of the hinge 29, the arm 28 extending at right angles to the arm 22, whereby the trolley wheel 27 will run on the same conductor as the trolley 23. By using three trolley wheels engaging the two conductors, the wheels are caused to run at a fixed angle to the transverse conductor 7 and the trolley thus prevented from jumping or slipping off said conductors.

In the operation of my system, the conductors 4 being in place and the transverse conductors 7 mounted on the conductors 4, by their trolley wheels 8, the transverse conductors 7 being supported at suitable intervals across the field by the intermediate supports described, the electrical traction engine or other vehicle to be used has its trolley placed on the transverse conductors in the manner illustrated in the figures, then the machine started. When one side of the field is reached the engine is steered to turn the same around and bring it in line for the next passage across the field, the engine operates through the trolley carried by the engine to move the transverse conductors 7 on the conductors 4, so that as the traction engine passes in parallel paths across the field, the transverse conductors 7 are moved along the conductors 4, until the other end of the field is reached.

I realize that considerable variation is possible in the details of construction and arrangement of parts, without departing from the spirit of my invention, and I therefore do not intend to limit myself to the specific form shown and described herein.

What I claim as new and desire to secure by Letters Patent is:

1. In an electrical agricultural system, the combination with a pair of main conductors, one located on each side of the area to be covered and parallel with each other, of a pair of transverse conductors arranged parallel to each other and provided with trolley wheels at their ends, one trolley wheel running on each of the main conductors, an electrically propelled vehicle, and trolley wheels carried by the vehicle and engaging the transverse conductors.

2. In an electrical agricultural system, the combination with a pair of main conductors, one located on each side of the area to be covered and parallel with each other, of a pair of trolley wheels adapted to run on the main conductors, elbow-shaped arms in the apex of which the trolley wheels are mounted, a pair of transverse conductors connected to the ends of the arms, an electrically propelled vehicle, and trolley wheels carried by the vehicle and engaging the transverse conductors.

3. In an electrical agricultural system, the combination with a pair of main conductors, one located on each side of the area to be covered and parallel with each other, of a pair of transverse conductors arranged parallel to each other and provided with trolley wheels at their ends, one trolley wheel running on each of the main conductors, a series of intermediate supports connected at their upper ends to the transverse conductors and provided with wheels on their lower ends, an electrically propelled vehicle and trolley wheels carried by the vehicle and engaging the transverse conductors.

4. In an electrical agricultural system, the combination with a pair of main conductors, one located on each side of the area to be covered and parallel with each other, of a pair of transverse conductors arranged parallel to each other and provided with trolley wheels at their ends, one trolley wheel running on each of the main conductors, a series of intermediate yielding supports connected at their upper ends to the transverse conductors and provided with wheels on their lower ends, an electrically propelled vehicle and trolley wheels carried by the vehicle and engaging the transverse conductors.

5. In an electrical agricultural system, the combination with a pair of main conductors, one located on each side of the area to be covered and parallel with each other, of a pair of transverse conductors arranged parallel to each other and provided with trolley wheels at their ends, one trolley wheel running on each of the main conductors, an electrically propelled vehicle, a trolley arm mounted on the vehicle, a plurality of trolley wheels carried by the arm and engaging the transverse conductors.

In testimony whereof I affix my signature in presence of two witnesses.

CHARLES S. DONEY.

Witnesses:
C. H. FOOT,
F. L. BROWNE.